Feb. 8, 1927.
W. F. HENDERSON
1,616,971
PREPARATION OF SAUSAGE CASINGS FOR STUFFING
Filed Aug. 20, 1926
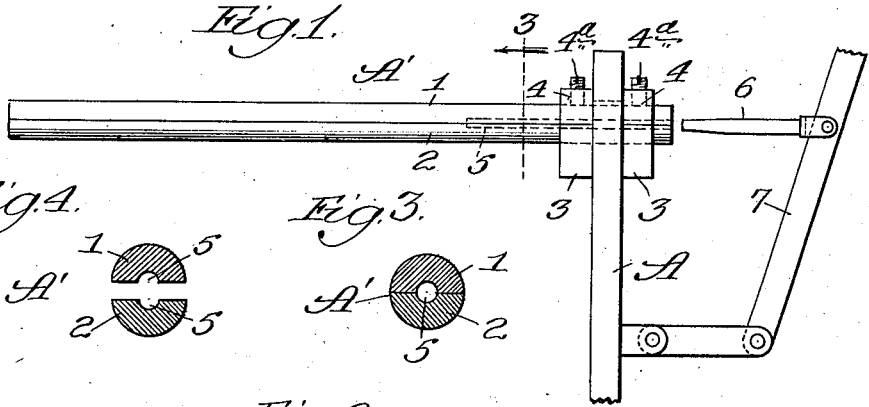
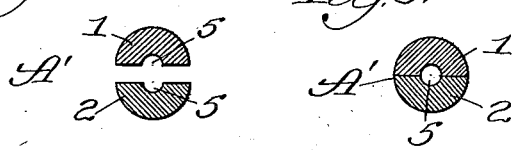
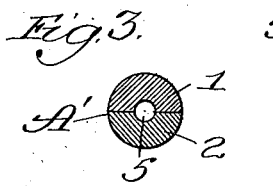
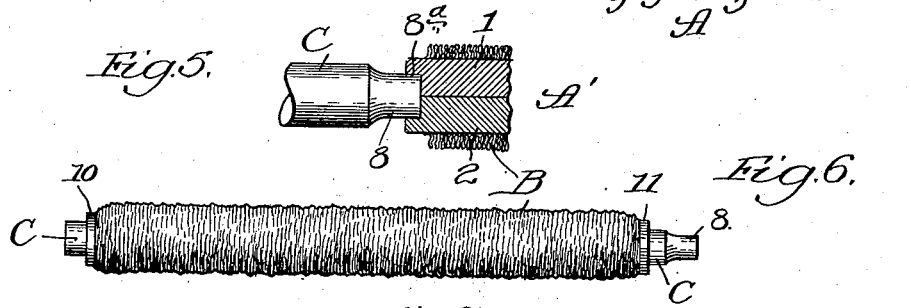
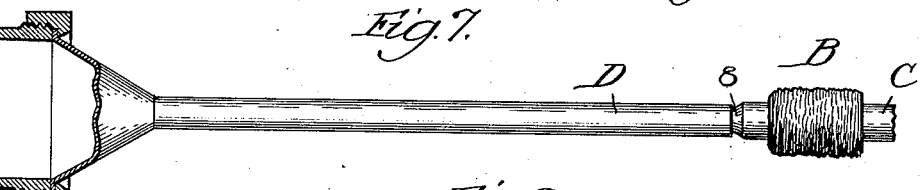
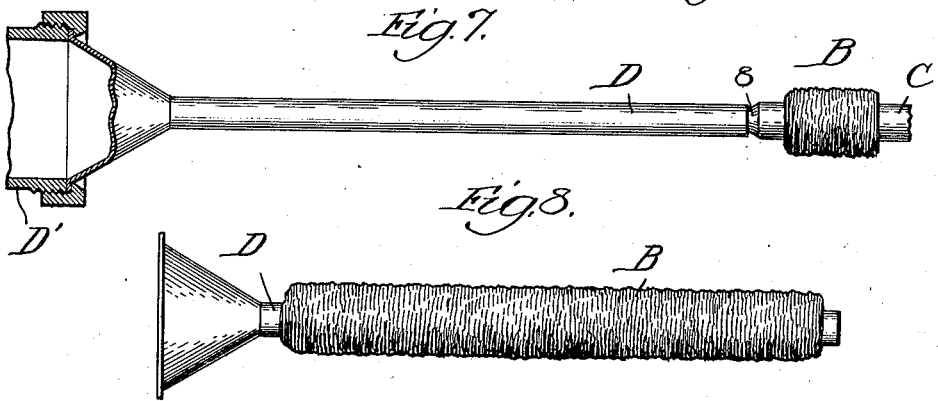
Inventor:
William F. Henderson,
By Dyrenforth, Lee, Chritton & Wiles
Attys Patented Feb. 8, 1927.

1,616,971

UNITED STATES PATENT OFFICE.

WILLIAM F. HENDERSON, OF CHICAGO, ILLINOIS, ASSIGNOR TO THE VISKING CORPORATION, OF CHICAGO, ILLINOIS, A CORPORATION OF VIRGINIA.

PREPARATION OF SAUSAGE CASINGS FOR STUFFING.

Application filed August 20, 1926. Serial No. 130,462.

This invention relates particularly to a method of preparing sausage-casings to facilitate stuffing. The method involves the loading of the casings on storage-mandrels in such condition that casings may be preserved indefinitely and may be used in packing houses to meet requirements.

The improved method is particularly desirable in connection with the handling of cellulose casings, but may be employed very advantageously in connection with animal casings, resulting in a large saving in either case.

A cellulose casing particularly well adapted to the present purpose is described in an application of William F. Henderson and Harold E. Dietrich, Serial No. 101,958, filed in the United States Patent Office April 14, 1926, such casing being formed by extruding viscose into tubular form and coagulating the viscose; purifying the casing; introducing into the casing a small percentage of a hygroscopic agent, such as glycerin; and drying the casing.

The same application describes a method of treating animal casings in such manner as to enable them to be properly preserved and readily used, without loss of casings. The treatment referred to comprises introducing into the animal casing a hygroscopic agent and inflating and drying the casing, the inflation being preferably within a limiting tube which facilitates the production of a casing of substantially uniform diameter.

According to the present process, dried casings, whether artificial casings or intestinal casings, preferably having embodied therein a small percentage of a hygroscopic agent, such as glycerin, are loaded in shirred condition upon a mandrel, which preferably is in form of a wooden rod, but which may be tubular and which should be of suitable material to prevent deterioration under atmospheric conditions. The casings thus loaded on storage-mandrels may be shipped to packing houses and preserved indefinitely. When it is desired to use a casing for stuffing purposes, the storage-mandrel, which is provided with a reduced extremity, is brought into alinement with the stuffer horn of the stuffing machine, the reduced extremity of the storage-mandrel being introduced in the free end of the stuffer horn; and the casing is readily transferred, as a unit, to the stuffing horn by a sliding movement.

The preferred practice of the process will be described with reference to the accompanying drawing, in which—

Fig. 1 is a broken elevational view of a collapsible mandrel carried by a suitable standard, the mandrel being shown in collapsed condition; Fig. 2, a similar view showing the mandrel in expanded condition and having shirred thereon a sausage casing; Fig. 3, a sectional view taken as indicated at line 3 of Fig. 1; Fig. 4 is a similar sectional view showing the collapsible mandrel in expanded condition; Fig. 5 is a broken view, partly in section, illustrating the manner in which the storage-mandrel is brought into alined engagement with the forming, collapsible mandrel, after the latter has been collapsed to facilitate the transfer of the shirred casing to the storage-mandrel; Fig. 6 is a view of the storage-mandrel having the shirred casing loaded thereon and retained in position by means of rubber bands, or rings; Fig. 7 is a broken view illustrating the manner in which the storage-mandrel is alined with the stuffer horn of the sausage machine when the casing is to be transferred to the stuffer horn; and Fig. 8 is a view of the stuffer horn having the casing in shirred condition thereon, ready for the stuffing operation.

In the illustration given, A designates a standard which may be secured to any suitable support (not shown); A', a collapsible mandrel carried by the standard A; B, the sausage casing in shirred condition; C, the storage mandrel; and D, a stuffer horn of a sausage machine D'.

The collapsible mandrel A' preferably comprises a pair of approximately half-circular sections 1 and 2, of suitable length. Assuming that we are dealing with a casing about one inch in diameter and that it is desired to mount about thirty-five feet of casing, the mandrel A' preferably is of about eleven-sixteenths inch diameter when expanded and about five-eighths inch diameter when collapsed; and a suitable length is about fifteen inches. The lower section 2 of the mandrel is fixedly mounted in a perforation in the standard A, being fitted with retaining blocks 3 disposed on opposite sides of the standard. The section 1 surmounts the section 2 and extends through the perforation in the standard A. The section 1 is secured in position by half-collars 4 and set screws 4ª.

The inner, or meeting, surfaces of the rod-sections 1 and 2 are recessed at their supported ends to provide a bore 5 adapted to receive a plunger 6 mounted on a lever 7. By inserting the plunger, the mandrel is expanded, it being noted that the perforation through the standard A is large enough to permit the upper section 1 of the mandrel to rise when the rod 6 is inserted.

Assuming the shirring mandrel to be in the expanded condition shown in Fig. 2, the casing, preferably in substantially dry condition, is gathered, or shirred, onto the mandrel, thus establishing a suitably large internal diameter for the shirred casing. The mandrel A' is then collapsed, and the storage-mandrel C, which is provided with a reduced extremity 8, is brought into alinement with the shirring-mandrel and the reduced extremity of the storage-mandrel is introduced into an end-recess 8ª with which the collapsible mandrel is provided. The shirred casing B is then moved bodily, by sliding movement, onto the storage-mandrel C. This may be accomplished conveniently by placing upon the shirring-mandrel A' a metal washer 9 previous to the operation of loading the casing onto the shirring-mandrel, and subsequently employing the washer 9 as a means for sliding the shirred casing onto the storage-mandrel.

The rear end of the storage-mandrel preferably has fitted thereon a rubber ring 10 against which one end of the shirred casing abuts. After the casing has been transferred to the storage-mandrel, another rubber ring 11 is placed in position to serve as a retainer.

The storage-mandrel preferably consists of a wooden rod produced from a suitable wood adapted to give a smooth finish. Maple serves the purpose very well, but other woods will answer the purpose. These wooden mandrels can be produced very cheaply. They are of a diameter preferably slightly less than the diameter of the shirring-mandrel A' in its collapsed condition, thus further facilitating the transfer of the shirred casing from the shirring-mandrel to the storage-mandrel.

Dried casings which contain a small percentage of a hygroscopic agent attract from the atmosphere a small amount of moisture sufficient to keep the casing desirably pliable and tenacious. The hygroscopic agent is employed in such small amount however as to avoid attracting so much moisture as to make the casing feel wet. In other words, the casing preferably is substantially dry, the moisture attracted by the hygroscopic agent being hardly sensible, but being sufficient to preserve softness and pliability.

Casings prepared and mounted on storage-mandrels in the manner described may be conveniently shipped, and may be readily transferred to the stuffer horn of a sausage stuffing machine. The transfer may be effected by entering the reduced end 8 of the storage-mandrel into the free extremity of the stuffer horn, after first removing the rubber washer 11. The transfer may then be effected by sliding the shirred casing bodily onto the stuffer horn in an obvious manner. When so mounted, the stuffing operation may be performed in the usual manner.

The storage-mandrel 8 preferably is sufficiently rigid to prevent deforming of the mandrel and the shirred casing mounted thereon. The shirred casings are thus kept in the best possible condition for storage until needed to meet the requirements for stuffing in the packing plant. It has been found that paper tubes do not serve well the purpose of a storage-mandrel, inasmuch as they tend to soften and disintegrate under atmospheric conditions and to become broken and collapsed, or partially collapsed in handling. Accordingly, the storage-mandrel should be of material which will not be injuriously affected by atmospheric conditions, or by the moderately rough usage to which the product is subjected in transportation and handling.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. The method of preparing a sausage casing for stuffing, which consists in shirring the casing on a collapsible shirring-mandrel to give the shirred casing a desired internal diameter, collapsing the shirring-mandrel, and sliding the shirred casing as a unit onto an alined storage-mandrel.

2. The method of preparing a sausage casing which comprises, loading the casing in shirred condition on a storage-mandrel having a reduced extremity, entering the reduced extremity of the storage-mandrel into the free end of a stuffer horn of a stuffing machine, and sliding the shirred casing as a unit onto said stuffer horn.

3. The method of preparing a sausage casing and mounting it on a stuffer horn of a sausage machine, which comprises: shirring the casing on a collapsible shirring-mandrel while in expanded condition to give to the shirred casing a desired internal diameter, collapsing the shirring-mandrel and sliding the shirred casing as a unit onto an alined storage-mandrel provided with a reduced extremity, entering the reduced extremity of the storage-mandrel in the free end of a stuffer horn of a sausage stuffing machine, and sliding the shirred casing as a unit onto said stuffer horn.

4. As a new article of manufacture, a storage-mandrel provided with a reduced extremity, a sausage casing in shirred condition on said mandrel, and retainer rings on said mandrel confining the shirred casing between them.

WILLIAM F. HENDERSON.